(12) United States Patent
Clark et al.

(10) Patent No.: US 7,305,522 B2
(45) Date of Patent: *Dec. 4, 2007

(54) VICTIM CACHE USING DIRECT INTERVENTION

(75) Inventors: Leo James Clark, Georgetown, TX (US); James Stephen Fields, Jr., Austin, TX (US); Guy Lynn Guthrie, Austin, TX (US); Bradley David McCredie, Austin, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 305 days.

This patent is subject to a terminal disclaimer.

(21) Appl. No.: 11/056,649

(22) Filed: Feb. 12, 2005

(65) Prior Publication Data

US 2006/0184742 A1    Aug. 17, 2006

(51) Int. Cl.
*G06F 12/00* (2006.01)
(52) U.S. Cl. .................. 711/124; 711/122; 711/121; 711/119; 711/133

(58) Field of Classification Search .................. None
See application file for complete search history.

(56) References Cited

U.S. PATENT DOCUMENTS

| 5,895,495 A * | 4/1999 | Arimilli et al. ............. 711/156 |
| 6,226,713 B1 * | 5/2001 | Mehrotra .................... 711/118 |
| 2006/0155792 A1 * | 7/2006 | Inoue et al. ................ 707/206 |

* cited by examiner

*Primary Examiner*—Hyung Sough
*Assistant Examiner*—Mardochee Chery
(74) *Attorney, Agent, or Firm*—Diana R. Gerhardt; Dillon & Yudell LLP

(57) ABSTRACT

A method, system, and device for enabling intervention across same-level cache memories. In a preferred embodiment, responsive to a cache miss in a first cache memory a direct intervention request is sent from the first cache memory to a second cache memory requesting a direct intervention that satisfies the cache miss. In an alternate embodiment, direct intervention is utilized to access a same-level victim cache.

1 Claim, 15 Drawing Sheets

VICTIM CACHE USING DIRECT INTERVENTION

CROSS-REFERENCE TO RELATED APPLICATIONS

The present application is related to and claims the benefit of co-pending U.S. patent application Ser. No. 11/056,673, entitled "CACHE MEMORY DIRECT INTERVENTION," filed on the same date herewith and which is incorporated herein by reference in their entirety.

BACKGROUND OF THE INVENTION

1. Technical Field

The present invention relates generally to computer memories, and in particular, to a system and method for implementing direct cache intervention across semi-private cache memory units. The present invention further relates to processing of castouts in a manner enabling victim caching across same-level cache memories deployed from hierarchically distinct cache memories.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multilevel cache hierarchy, the lower level(s) of which may be shared by one or more processor cores.

Cache memories are commonly utilized to temporarily store values that might be accessed by a processor in order to speed up processing by reducing access latency introduced by having loading needed values from memory. In some multiprocessor (MP) systems, the cache hierarchy includes at least two levels. The level one (L1), or upper-level cache is usually a private cache associated with a particular processor core and cannot be accessed by other cores in an MP system. The processor core first looks for a data in the upper-level cache. If the requested data is not found in the upper-level cache, the processor core then access lower-level caches (e.g., level two (L2) or level three (L3) caches) for the requested data. The lowest level cache (e.g., L3) is often shared among several processor cores.

At the not fully shared levels of memory, (typically one or more of the upper levels such as L1, L2, and L3 cache levels within a given cache hierarchy), the cache memory is directly accessible by its the processor core and other cache units that are part of the same hierarchy. For upper level cache units outside the given hierarchy and system memory, the given cache is not directly accessible but must instead be accessed by a shared bus transaction in which read and write requests are placed on a shared bus and retrieved and responded to by lower level memory or intervention snooping.

There is a need for a more intelligent system and method for managing a multi-level memory hierarchy to reduce unnecessary memory bus traffic and latency. There is also a need to improve utilization of cache memories included in hierarchies having non-utilized processors.

The present invention addresses these and other needs unresolved by the prior art.

SUMMARY OF THE INVENTION

It is therefore one object of the invention to provide an improved method for handling cache operations in a multi-processor computer system.

It is another object of the present invention to provide such a method that enables direct cache intervention across multiple same-level caches that reside in different cache hierarchies.

It is yet another object of the present invention to provide a computer system that leverage the direct intervention method to provide fully accessible victim caching across caches residing in different cache hierarchies.

The foregoing objectives are achieved in a method, system, and device for enabling intervention across same-level cache memories as disclosed herein. In a preferred embodiment, a direct intervention request is sent from the first cache memory to a second cache memory requesting a direct intervention that satisfies a data access request sent from a processor core to the first cache memory. In another embodiment, the present invention provides a direct castin technique combined with the direct intervention to enable victim caching across same-level cache memories deployed from hierarchically distinct cache memories.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is generally directed to cache intervention and, more specifically, to an improved cache intervention technique whereby private cache memories directly access other private caches without the need for shared interconnect request processing.

Figure 1:
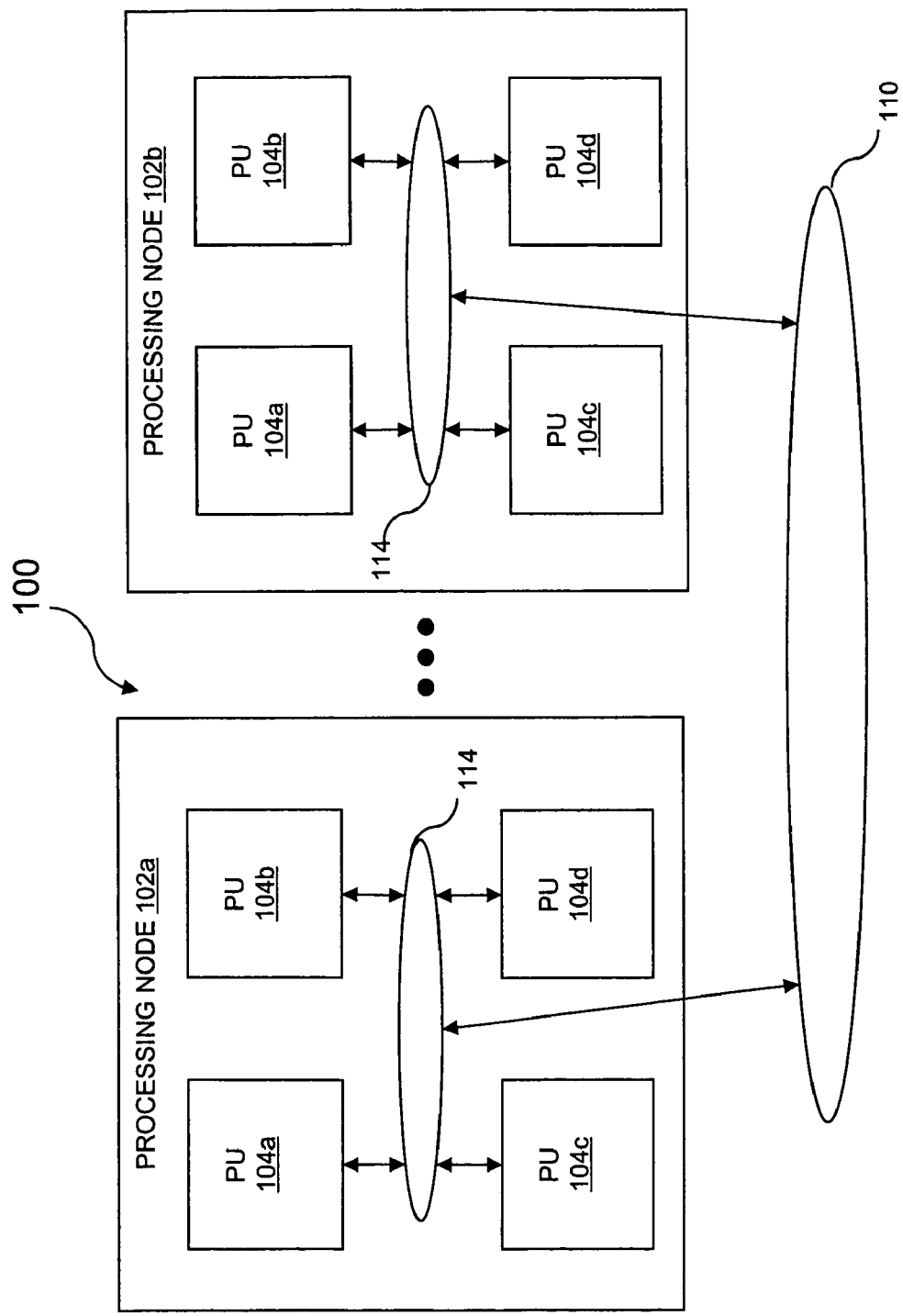
FIG. 1 is a high-level block diagram depicting an exemplary data processing system in which the present invention may be implemented.

With reference now to the figures, wherein like reference numerals refer to like and corresponding parts throughout, and in particular with reference to FIG. 1, there is illustrated a high-level block diagram depicting an exemplary data processing system in which the present invention may be implemented. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches.

Figure 2:
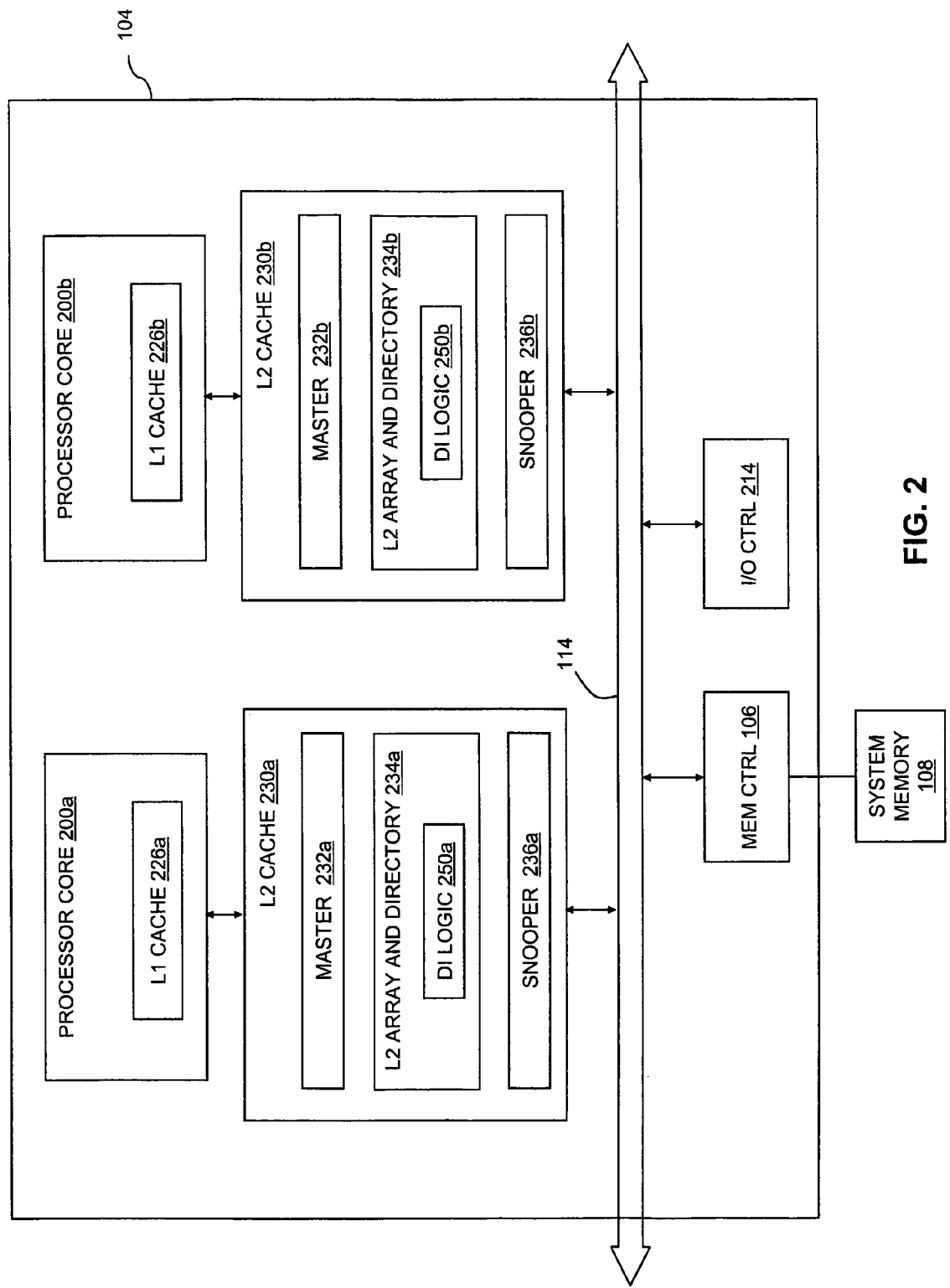
FIG. 2 is a more detailed block diagram of a processing unit in which the present invention may be implement.

The devices attached to each local interconnect 114 include not only processing units 104, but also one or more memory controllers (not depicted), each providing an interface to a respective system memory 108 (depicted in FIG. 2). Data and instructions residing in system memory 108 can generally be accessed and modified by a processor core in any processing unit 104 of any processing node 102 within data processing system 100. In alternative embodiments of the invention, one or more memory controllers 106 (and system memory 108) can be coupled to system interconnect 110 rather than a local interconnect 114, or alternatively, integrated within another device such as a processing unit 104.

Those skilled in the art will appreciate that SMP data processing system 100 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. While not expressly depicted in FIG. 2, each processor core 200 includes one or more execution units and supporting sequencing logic for executing instructions. The instructions executed by the execution units include instructions that request access to a memory block or cause the generation of a request for access to a memory block.

The operation of each processor core 200 is supported by a multi-level volatile memory hierarchy having at its lowest level shared system memory 108, and at its upper levels one or more levels of cache memory, which in the illustrative embodiment include a store-through level one (L1) cache 226 within and private to each processor core 200, and a respective level two (L2) cache 230, which, as explained in further detail below, is semi-private to its respective core and is accessible via the direct intervention technique of the present invention. L2 cache 230 includes an L2 array and directory 234, a master 232 and a snooper 236. Master 232 initiates transactions on local interconnect 114 and system interconnect 110 and accesses L2 array and directory 234 in response to memory access (and other) requests received from the associated processor core 200. Snooper 236 snoops operations on local interconnect 114, provides appropriate responses, and performs any accesses to L2 array and directory 234 required by the operations.

Although the illustrated cache hierarchies includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 includes an integrated I/O (input/output) controller 214 supporting the attachment of one or more I/O devices. As discussed further below, I/O controller 214 may issue read and write operations on its local interconnect 114 and system interconnect 110, for example, in response to requests by attached I/O device (not depicted).

As further illustrated in FIG. 2, each L2 cache 230 further comprises a direct intervention (DI) module 250 communicatively coupled with the L2 array and directory 234 as well as master 232 and snooper 236. DI module 250 is preferably integrated into cache directory arbiter logic (depicted and described with reference to FIGS. 3-7) and includes program modules for performing direct cache intervention of the present invention as explained in further detail with reference to FIGS. 4-7.

Figure 3:
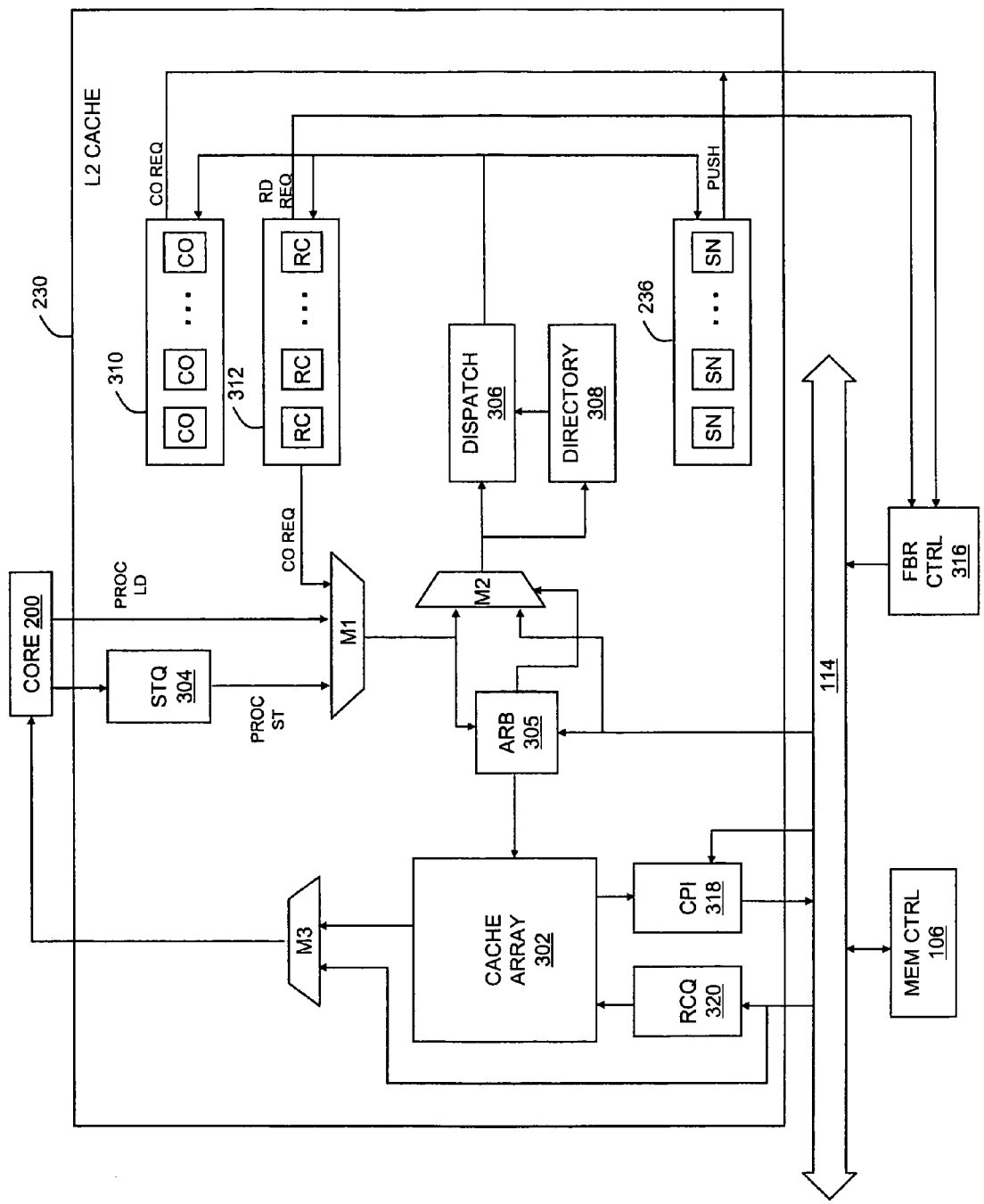
FIG. 3 is a more detailed block diagram of an L2 cache in which the present invention may be implemented.

With reference now to FIG. 3, there is illustrated a more detailed block diagram of an exemplary embodiment of an L2 cache 230 that may by utilized to implement direct intervention for memory access operations performed by processor cores 200a and 200b. As shown in FIG. 3, the array and directory 234 of L2 cache 230 generally comprises a cache memory array 302 and a directory 308 of the contents of array 302. Assuming cache array 302 and directory 308 form a set associative unit, and as in conventional set associative caches, memory locations in system memories are mapped to particular congruence classes within cache array 302 utilizing predetermined index bits within the system memory (real) addresses. The particular cache lines stored within cache array 302 are recorded in cache directory 308, which contains one directory entry for each cache line in cache array 302. While not expressly depicted in FIG. 3, it will be understood by those skilled in the art that each directory entry in cache directory 308 includes various entry identifier and indexing fields such as tag fields for using a tag portion of the corresponding real address to specify the particular cache line stored in cache array 302, state fields that indicate the coherency state of the cache lines, and a LRU (Least Recently Used) field indicating a replacement order for the cache line with respect to other cache lines in the same congruence class.

In its conventional role, arbiter logic 305 arbitrates the order of processing of memory access requests from core 200 and interconnect 114. Memory access requests, including load and store operations, are forwarded in accordance with the arbitration policy implemented by arbiter 305 to a dispatch pipe 306 where each read and write request is processed with respect to directory 308 over a given number of cycles. The direct intervention module 250 depicted in FIG. 2, is fully or partially implemented as part of or in association with arbiter logic 305 within L2 cache 230 and includes instructions and modules for implementing the methods described below with reference to the following figures.

As further shown in FIG. 3, the master 232 of L2 cache 230 comprises RC (read claim) machines 312 that individually handle memory access requests issued from core 200 and CO (castout) machines 310 that manage the removal and writeback of memory blocks from cache array 302. Snoop machines 236 respond to memory access requests "snooped" from interconnect 114.

L2 cache 230 further includes an RC queue 320 and a CPI (castout push intervention) queue 318 that buffer data being inserted and removed from the cache array 302. RC queue 320 includes a number of buffer entries that each individually correspond to a particular one of RC machines such that each RC 312 that is dispatched retrieves data from only the designated buffer entry. Similarly, CPI queue 318 includes a number of buffer entries that each individually correspond to a particular one of the castout machines 310 and snoop machines 236, such that each CO machine 310 and each snooper 236 that is dispatched retrieves data from only the respective designated CPI buffer entry.

Figure 4A:
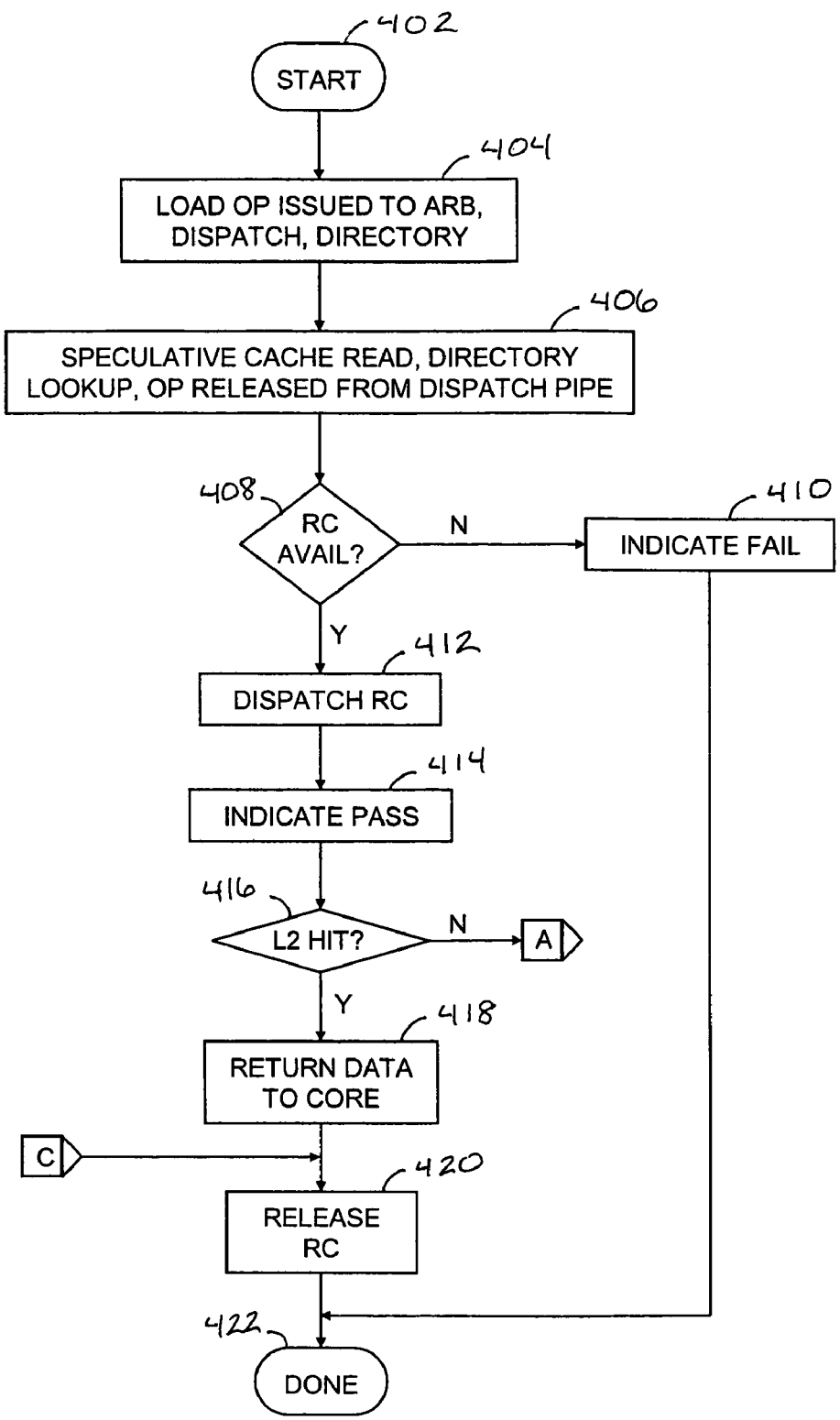
FIG. 4A is a flow diagram illustrating steps performed within an L2 cache during a load operation.

Referring to FIG. 4A, there is depicted a flow diagram illustrating steps performed during a conventional cache load operation by an exemplary L2 cache such as L2 cache 230. The process commences as shown at steps 402 and 404 with a load operation from core 200 sent to arbiter 305, dispatch pipe 306, and directory 308. In accordance with conventional load operation processing, arbiter 305, dispatch 306, and directory 308 process the received load in parallel as illustrated at step 406. Specifically, arbiter 305 speculatively reads cache array 302 for the requested cache line while the request traverses dispatch pipe 306 during the directory lookup in directory 308.

Following release of the load from dispatch pipe 306, continued processing of the command depends on availability of one of RC machines 312 for processing the command. As shown at steps 408, 410, and 422, the processing of the load operation terminates if no RC machine 312 is available. Otherwise, an available RC machine 312 is dispatched to handle the load operation as depicted at steps 408 and 412. A pass indicator signals a successfully dispatched RC (step 414) so that the load is not re-issued. If the requested cache line is in array 302 and is verified by the coherence state read from directory 308 as valid, the RC machine 312 signals the third multiplexer M3 to return the data to core 200 as shown at steps 416 and 418. Processing of the cache hit concludes with the dispatched RC machine 312 being de-allocated or released as shown at steps 420 and 422.

Figure 4B:
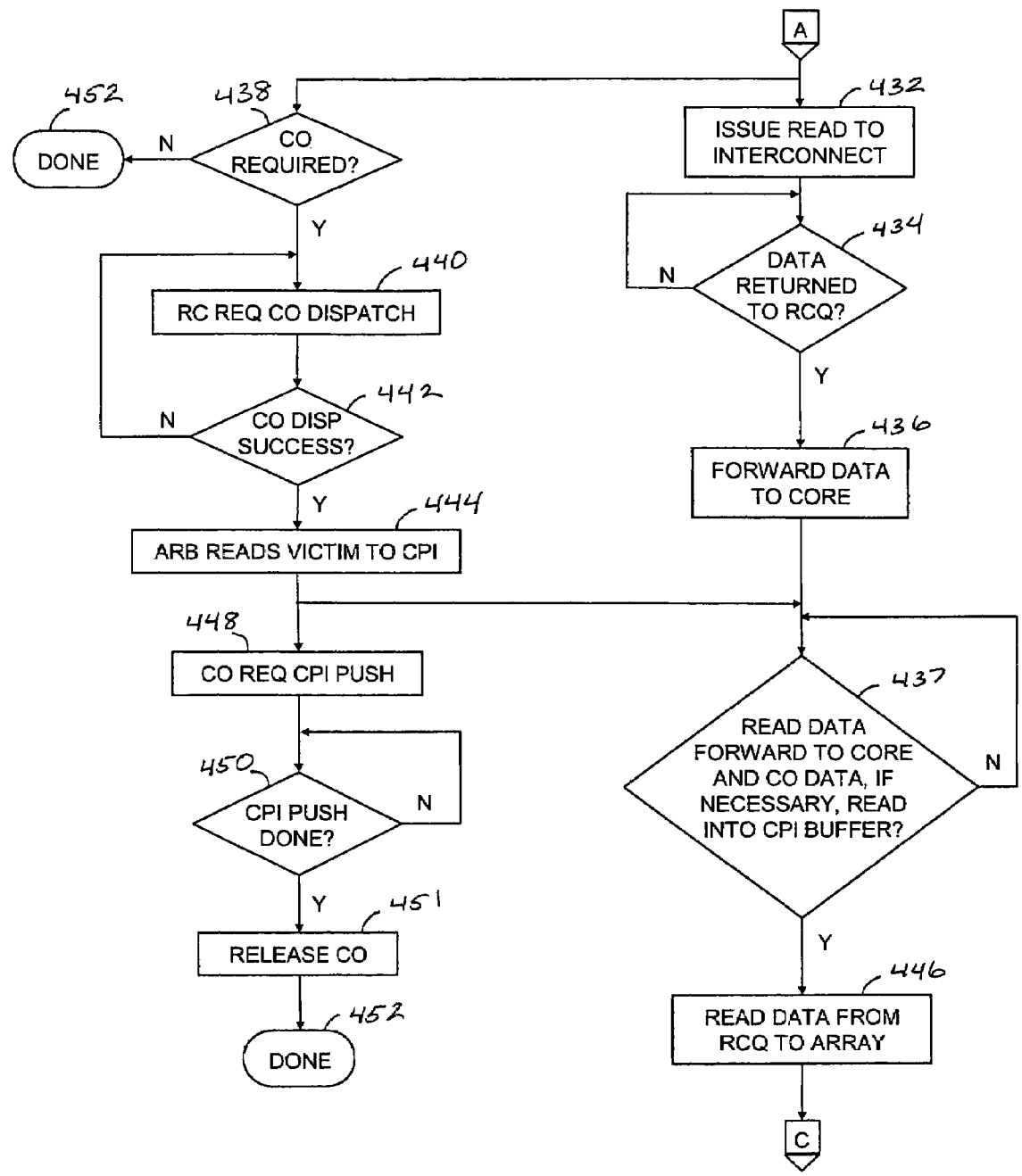
FIG. 4B is a flow diagram depicting steps performed within an L2 cache in response to a load miss.

FIG. 4B depicts steps performed within L2 cache 230 in response to a miss at step 416. As depicted at step 432, the assigned RC machine 312 issues a read request on interconnect 114 and awaits return of the requested data into an RC queue 320 that buffers incoming cache lines to be placed in array 302. Once the data is returned to RC queue 320 (step 434) the data is forwarded to processor core 200 via M3 (step 436). As shown at step 438, if a castout from the target congruence class in array 302 is not required, the castout process ends as shown at step 452. If a castout is required in accordance with congruence class occupancy or otherwise, RC machine 312 issues a castout request via M1 to arbiter 305 and dispatch pipe 306, which dispatches one of CO machines 310 to handle the castout, as illustrated at steps 438 and 440. The relative instruction processing responsibilities usually dictate that there are a greater number of RC machines 312 than CO machines 310. RC machine 312 therefore repeats the castout request until a CO machine 310 is available and successfully dispatched (steps 440 and 442).

Following successful dispatch of the CO machine (step 442), arbiter 305 reads the victim cache line out of array 302 to a CPI (castout push intervention) queue 318 (step 444) in preparation for the victim line to be placed in a lower level cache or system memory. Responsive to both the victim line being read out to CPI queue 318 at step 444 (if a castout was necessary) and also the read data being forwarded at step 436, the data is transferred from RC queue 320 into the appropriate line in array 302, as shown at steps 437 and 446. After the data is transferred from RC queue 320 into the appropriate line in array 302, the RC machine is deallocated and the read process terminates as depicted at steps 420 and 422.

Returning to castout processing, the CO machine 310 issues a request to fabric controller 316 for the victim line to be pushed from CPI queue 318 to the lower level memory via interconnect 114 (step 448). The victim line push is processed and completed followed by the CO machine being released as shown at steps 450, 451, and 452.

The present invention provides an improved intervention method by which caches, such as L2 caches 230a and 230b which are otherwise private to their respective cores, can perform what is referred to herein as a "direct intervention" in response to a cache miss. As will be depicted and explained with reference to the following figures such direct intervention is performed speculatively (i.e. in parallel with the memory access operation in the host cache) and reduces the likelihood of having to process a shared bus request responsive to a cache miss.

Figure 5A:
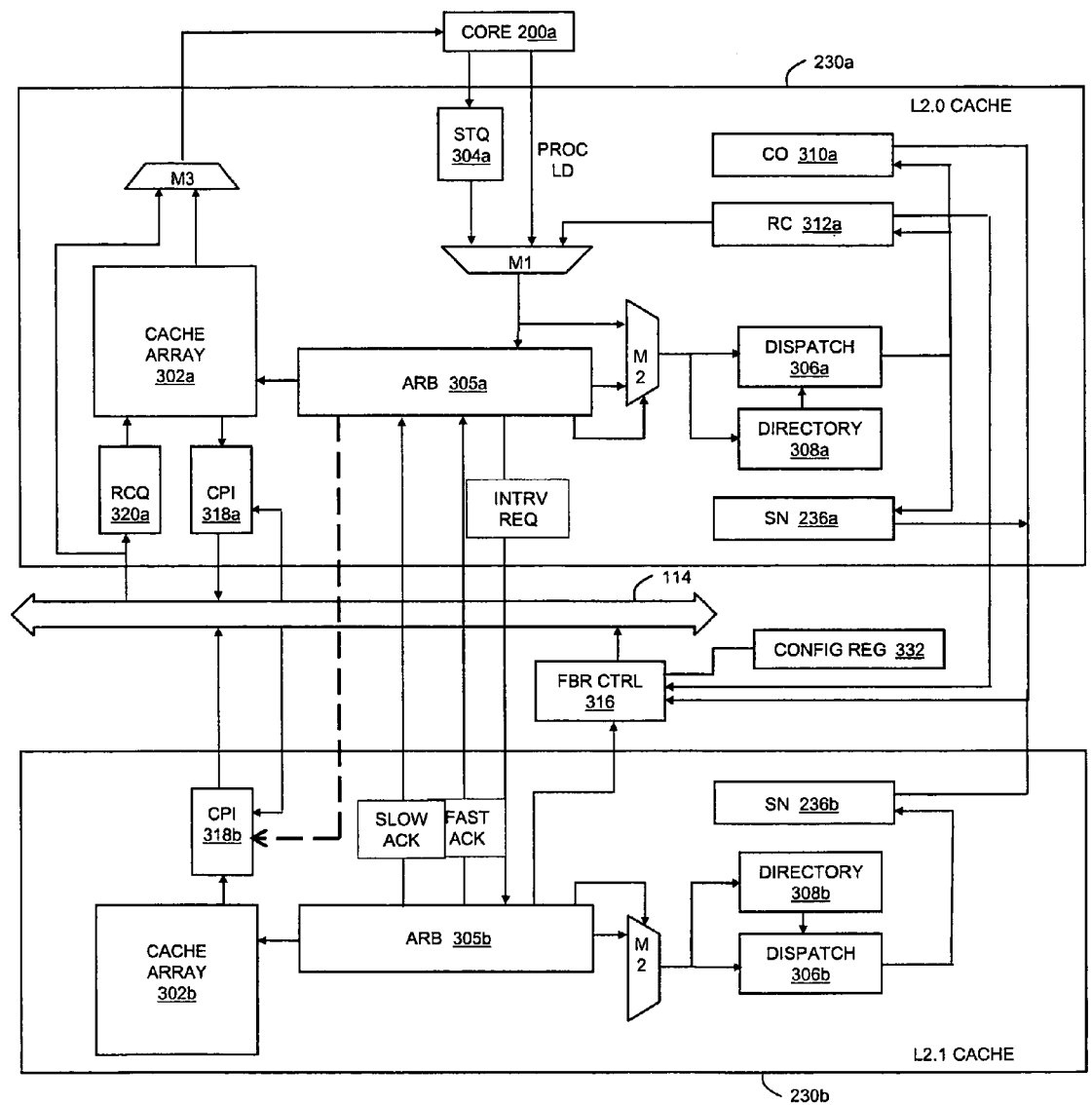
FIG. 5A is a block diagram illustrating a pair of semi-private L2 caches adapted for implementing direct cache intervention in accordance with a preferred embodiment of the present invention.
Figure 5B:
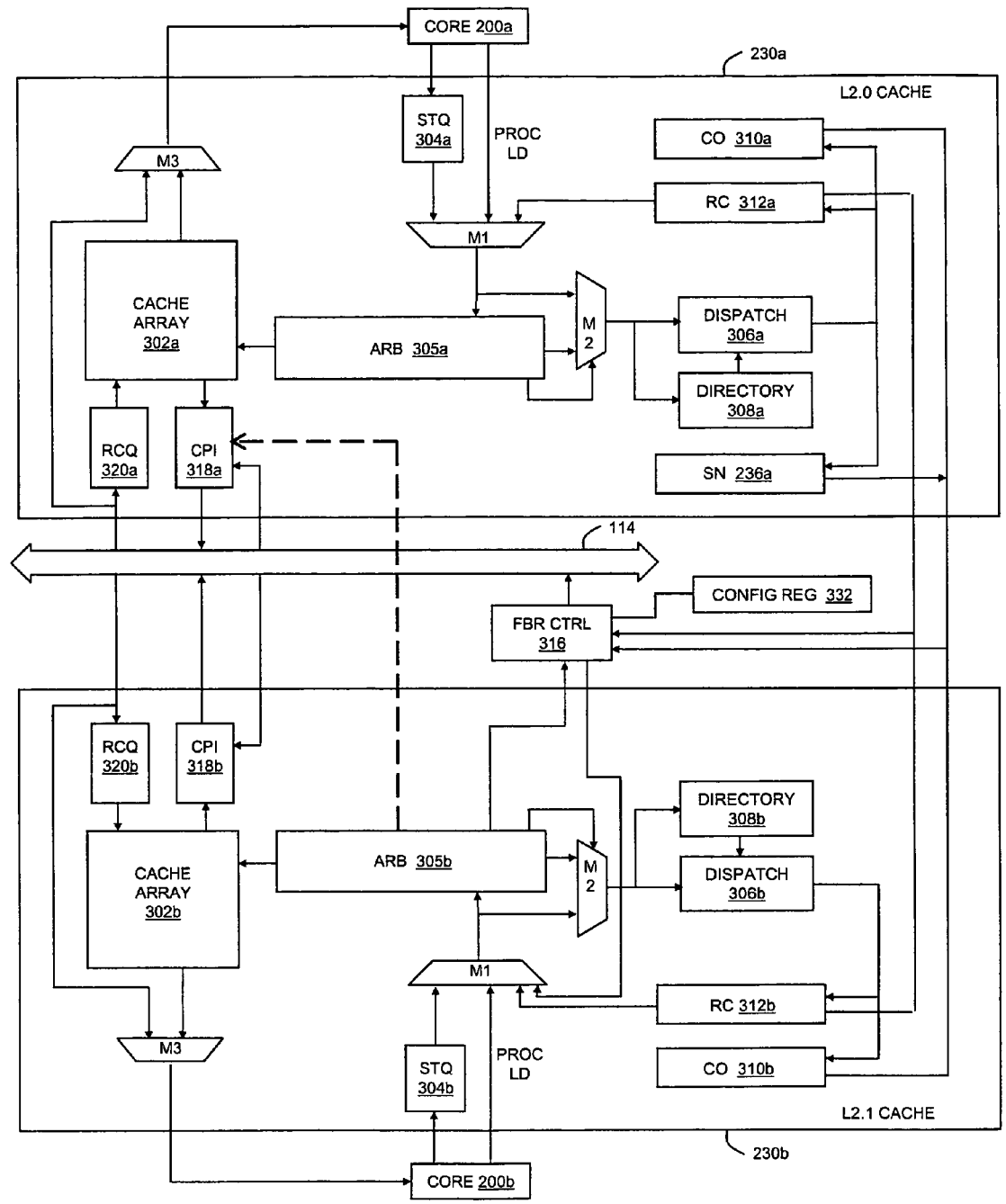
FIG. 5B is a block diagram illustrating a pair of semi-private L2 caches adapted for implementing victim cache processing in accordance with a preferred embodiment of the present invention.

FIG. 5A and FIG. 5B are block diagrams illustrating a pair of semi-private L2 caches such as those deployed on each of processing units 104. Specifically, L2 cache 230a and 230b are depicted at a sufficient level of detail to illustrate the functions and adaptations provided by the present invention to enable direct intervention and victim caching between the L2 caches. For clarity of explanation, the direct cache intervention and victim caching of the present invention are each described only in a single direction from one specified L2 cache unit to the other. It will be apparent to those skilled in the art that both caches 230a and 230b may simultaneously implement direct intervention from caches 230b and 230a respectively even though intervention processing is depicted herein in only one direction. Likewise, either cache 230a or 230b may serve as the victim cache to cache 230b and 230a respectively even though only using cache 230b as a victim cache is shown. To facilitate clarity of description, the respective caches will be further designated as L2.0 and L2.1 will be used to further designate caches 230a and 230b, respectively.

Figure 6A:
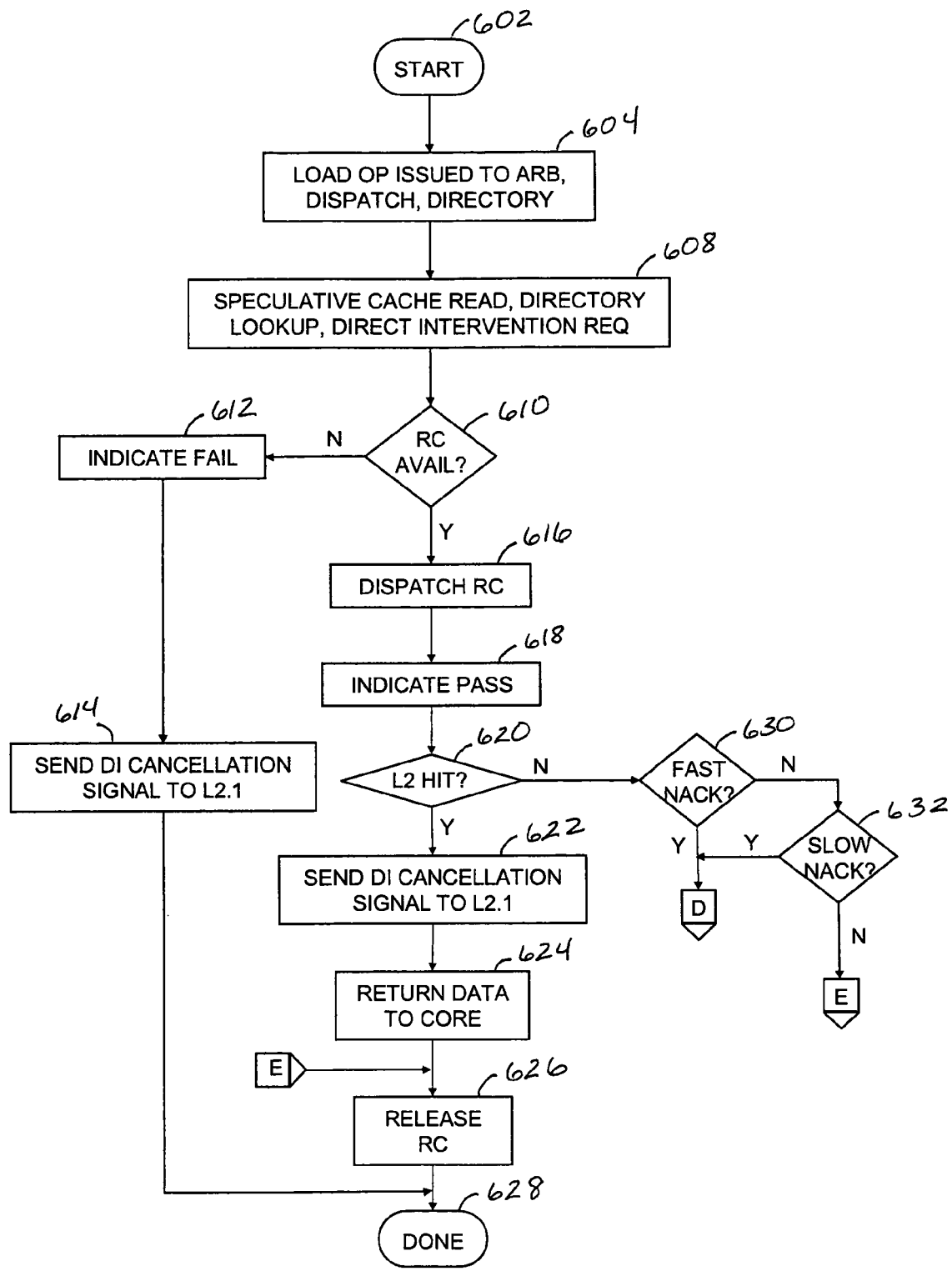
FIG. 6A is a high-level flow diagram depicting steps performed within an L2 cache during a load operation in accordance with the present invention.
Figure 6B:
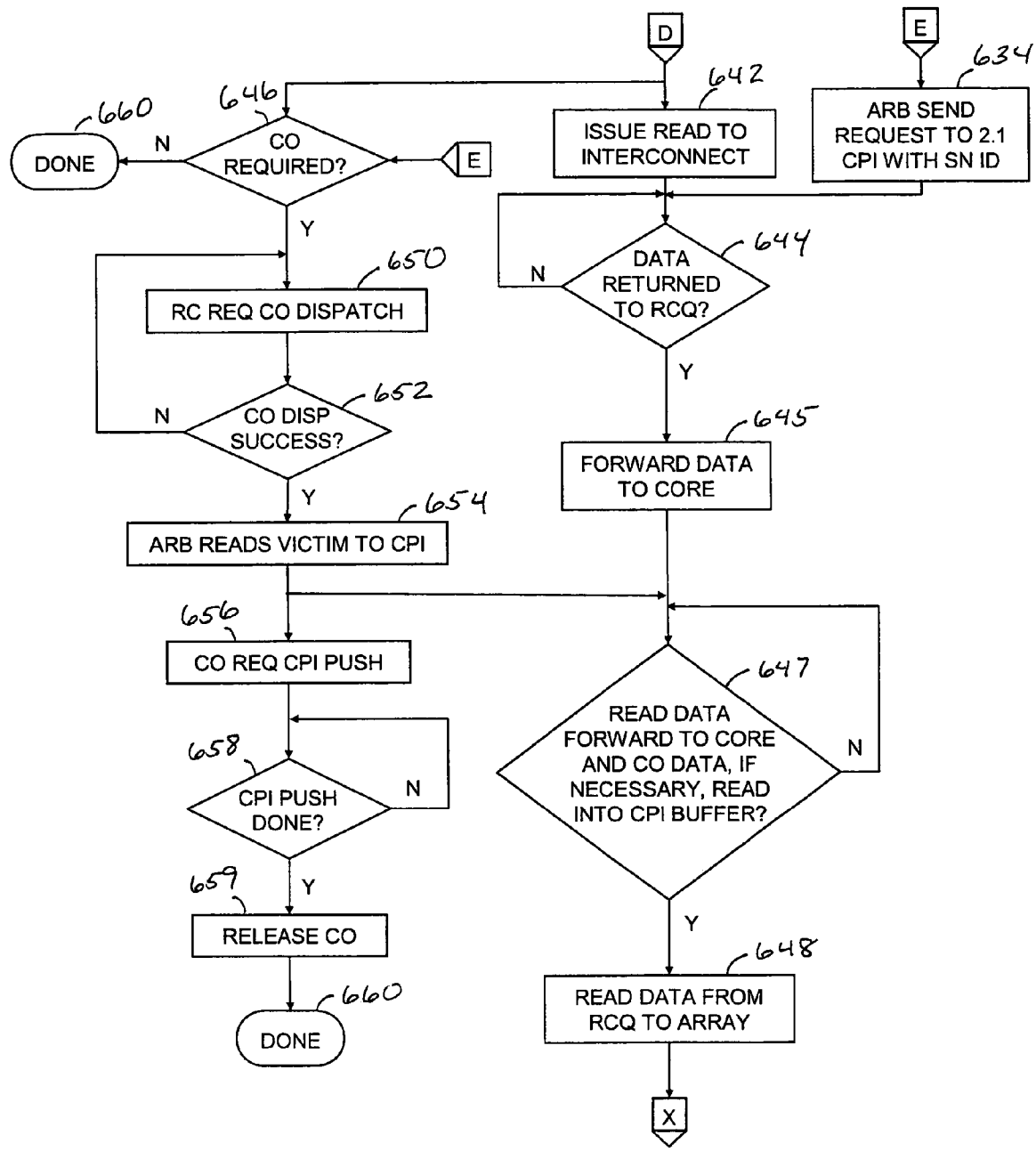
FIG. 6B is a high-level flow diagram illustrating steps performed within an L2 cache responsive to a load miss in accordance with the present invention.

As explained with reference to FIGS. 6-10, L2.0 cache 230a and L2.1 cache 230b incorporate the features depicted in FIG. 5A and FIG. 5B as well as direct intervention logic and castout logic adapted for implementing direct cache intervention and victim cache processing in accordance with a preferred embodiment of the present invention. Referring to FIGS. 6A and 6B in conjunction with FIG. 5A, there are illustrated high-level flow diagrams depicting steps performed within an L2 cache during a load operation in accordance with the present invention. The load operation described is a load performed by the L2.0 cache 230a. The direct intervention described below results from the load performed by the L2.0 cache 230a in association with the L2.1 cache 230b and is referred to as an "L2.1 intervention." The process commences as shown at steps 602 and 604 with a load operation from core 200a sent to arbiter 305a, dispatch pipe 306a, and directory 308a. In accordance with conventional load operation processing, arbiter 305a, dispatch 306a, and directory 308a process the received load in parallel as illustrated at step 608. Specifically, arbiter 305a speculatively reads cache array 302a for the requested cache line while the request traverses dispatch pipe 306a during the directory lookup in directory 308a. In addition, and as further depicted at step 608, an L2.1 direct invention request, INTRV REQ, is speculatively sent from arbiter 305a to arbiter 305b in the L2.1 cache 230b substantially in parallel with the speculative read and directory lookup in L2.0 cache 230a. The INTRV REQ includes the address of the requested cache line.

Following release of the load from dispatch pipe 306a, continued processing of the load operation depends on availability of one of RC machines 312a for processing the command. As shown at steps 610, 612, 614, and 628, processing of the load operation terminates if no RC machine 312 is available. Furthermore, an RC dispatch failure results in arbiter 305a issuing a direct intervention cancellation signal (not depicted) to the L2.1 arbiter 305b (step 614) resulting in L2.1 cache 230b canceling further processing of the direct intervention request.

Otherwise, as shown at step 610 and 616, an available RC machine 312 is dispatched to handle the L2.0 load operation. A pass indicator signals a successfully dispatched RC (step 618) so that the load is not re-issued. If the requested cache line is in L2.0 array 302a and is verified by the coherence state read from directory 308a as valid, RC machine 312a signals the third multiplexer M3 to return the data to core 200a as shown at steps 620 and 624. Given the successful load, arbiter 305a issues a direct intervention cancellation signal to the L2.1 arbiter 305b (step 622) to cancel further L2.1 cache 230b processing of the direct intervention request. Processing of the cache hit concludes by deallocating the dispatched RC machine 312a as shown at steps 626 and 628.

Next is described the steps performed by the L2.0 cache 230a responsive to a miss at step 620 in accordance with the direct intervention mechanism and technique of the present invention. As shown on FIG. 5A, and explained in further detail with reference to FIG. 7, L2.1 arbiter may respond to the direct intervention request, INTRV REQ, with an early or a late acknowledgement signal, referred to herein as "fast ACK" and "slow ACK," respectively. As utilized herein an "ACK" signals to the L2.0 cache logic that the intervention process will proceed on the L2.1 side and therefore that a system bus access should not be commenced until resolution of the direct intervention. A NACK (negative acknowledgement), if early or "fast" signals that the L2.1 cache 230b does not accept the direct intervention request, or if late or "slow," that the intervention processing failed on the L2.1 side, and thus that the L2.0 cache may process with a memory access on the system bus.

If a fast or slowNACK has been received by the L2.0 arbiter 305a (step 630) and the L2.0 cache 230a misses at step 620, the load operation processing commences in the conventional manner. Namely, a read request is issued onto interconnect 114 as shown at step 642. The assigned RC machine 312a issues the read request on interconnect 114 and waits for return of the requested data into RC queue 320a that buffers incoming cache lines to be placed in array 302a. Once the data is returned to RC queue 320a (step 644) the data is forwarded to processor core 200a via M3 (step 645).

If a castout was not required (step 646), the castout process ends as shown at step 660. If a castout is required in accordance with congruence class occupancy or otherwise, RC machine 312a issues a castout request via M1 to arbiter 305a and dispatch pipe 306a, which dispatches one of CO machines 310a to handle the castout, as illustrated at steps 646 and 650. RC machine 312a may have to repeat the castout request until a CO machine 310a is available and successfully dispatched (steps 650 and 652).

Following successful dispatch of the CO machine 310 (step 652), arbiter 305a reads the victim cache line out of array 302a to CPI queue 318a (step 654) in preparation for the victim line to be placed in a lower level cache or system memory. Responsive to both the victim line being read out to CPI queue 318a at step 654 (if a castout was required) and also the read data being forwarded at step 645, the data buffered in the RC queue 320a is transferred into the appropriate line in array 302a as shown at steps 647 and 648. Finally, RC machine 312a is released as shown at step 626 and the read process concludes at step 628.

Returning to castout processing, the CO machine 310a issues a request to fabric controller 316 for the victim line to be pushed from CPI queue 318a to the lower level memory via interconnect 114 (step 656). The victim line push is processed and completed and the CO machine 310a released as shown at steps 658, 659, and 660.

If, however, a fast and a slow positive acknowledgement was received by L2.0 arbiter 305a as shown at 630 and 632, the process continues with arbiter 305a sending the push request to L2.1 CPI queue 318b (step 634). The request preferably includes the tag or other identifier of the L2.1 snoop machine 236b that was dispatched by arbiter 305b responsive to the direct intervention request (explained further with reference to FIG. 7). In a preferred embodiment, L2.0 arbiter 305a received the snoop machine tag with the slow ACK delivered from L2.1 arbiter 305b. Following the data push, the data is received in the buffer entry within RC queue 320a corresponding to the RC machine 312a handling the load operation and the procedure continues as previously explained beginning at step 646 and 634.

Figure 7:
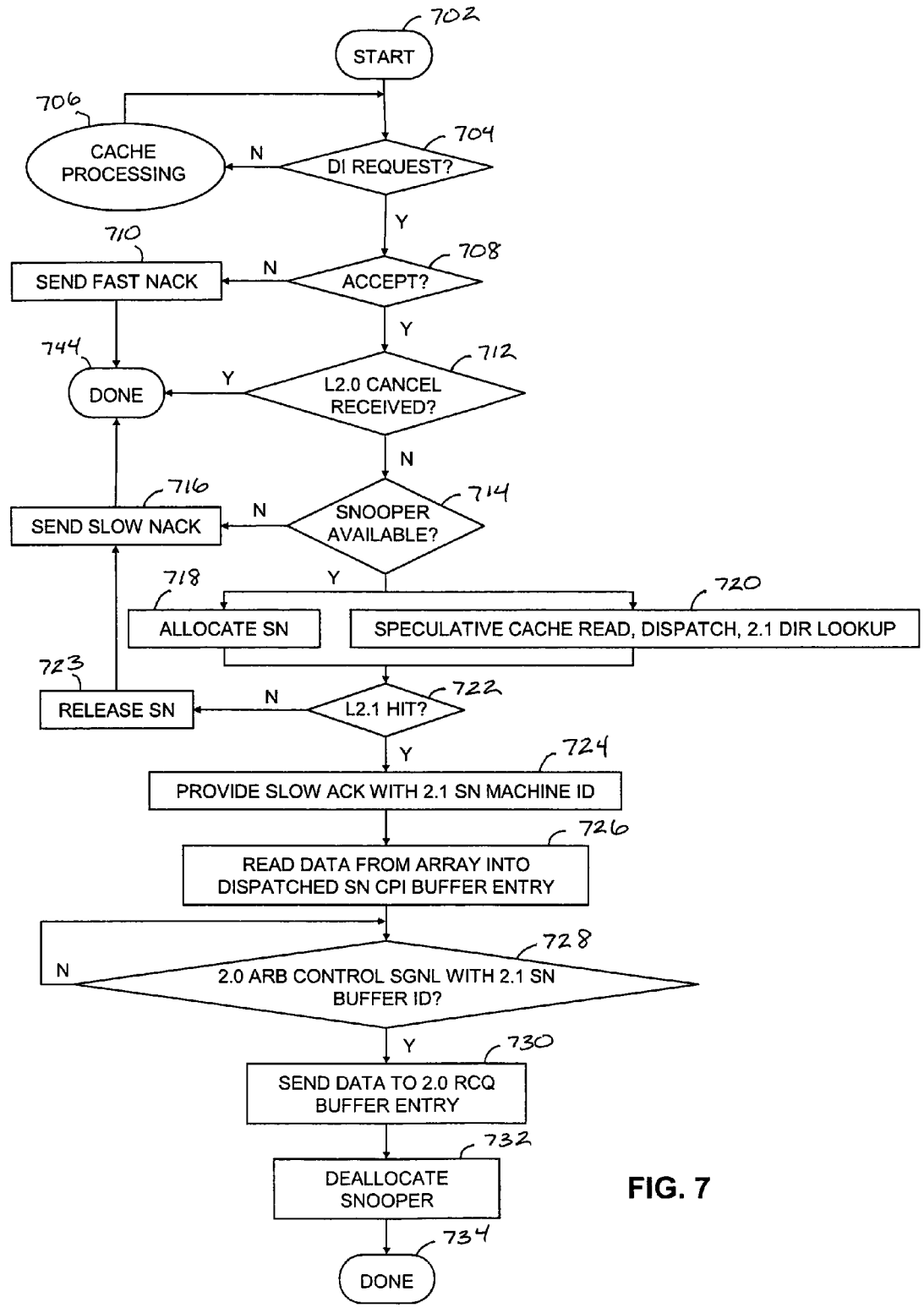
FIG. 7 is a high-level flow diagram depicting steps performed by a direct intervention L2 cache in association with the load processing shown in FIGS. 6A and 6B.

Referring to FIG. 7 in conjunction with FIGS. 6A and 6B, there is illustrated a high-level flow diagram depicting direct intervention processing performed by L2.1 cache 230b in association with the load operation. The process begins at step 702 and, in the absence of a direct intervention request, INTRV REQ, from L2.0 arbiter 305a, L2.1 cache 230b continues cache processing that is primarily private to the core 200b in its respective cache hierarchy as shown at steps 704 ad 706. Responsive to a receiving direct invention request, L2.1 cache 230b may or may not accept the request, and if not, arbiter 305b sends FAST NACK, or equivalent negative response, to L2.0 arbiter 305a directing the L2.0 cache 230a to process the load without direct intervention (steps 708, 710) and L2.1 processing in association with the 2.0 load operation ends (step 744). Otherwise, direct intervention processing by the L2.1 cache 230b commences responsive to acceptance of the request at step 708.

As shown at step 712, and referring back to blocks 614 and 622 of FIG. 6A, an L2.0 direct intervention cancellation received by arbiter 305b results in termination of the direct intervention. A key feature of the L2.1 intervention is allocation of one of the L2.1 snoop machines 236b to handle the intervention request. If an L2.1 snoop machine 236b is not available, the direct intervention fails and arbiter 305b sends a SLOW NACK to the L2.0 cache and the process ends as depicted at steps 714, 716 and 744. If a snoop machine 236b is available, the snoop machine 236b is allocated and arbiter 305b speculatively reads cache array 302b for the requested cache line identified in the received INTRV REQ while the request traverses dispatch pipe 306b during the directory lookup in directory 308b (steps 718 and 720).

In response to a L2.1 cache miss, arbiter 305b sends a SLOW NACK to arbiter 305a to tenninate the direct intervention process and signal the L2.0 cache 230a to proceed with a typical shared bus load request and de-allocates snoop machine 236b allocated in step 718 as shown at steps 722, 723, 716, and 744. Otherwise, responsive to a cache hit at step 722, the direct intervention process continues with arbiter 305b sending a SLOW ACK to L2.0 arbiter 305a including the tag identifier of the snoop machine 236b dispatched at block 718. Next, as illustrated at step 726, L2.1 arbiter 305b reads the cache line from cache array 302b into the buffer entry of CPI queue 318b corresponding to the dispatched snoop machine 236b.

Proceeding as shown at steps 728 and 730, when CPI queue 318b receives the request sent as shown at block 634 from L2.0 arbiter 305a with the snoop tag identifier, the data sent to the buffer entry in RCQ 320a corresponding to the L2.0 RC machine 312a handling the load operation. Having thus directly transferred the data without undertaking a shared bus transaction, the direct intervention process ends as shown at steps 732 and 734 with the L2.1 snoop machine 236b being deallocated.

The present invention further provides an improved castout processing method and mechanism that enables a cache unit included in a memory hierarchy of a processor core to castout "sideways" to another same-level cache unit that is otherwise within the private memory hierarchy of another core and which may serve as a victim cache under certain circumstances. Referring to FIG. 2, one such circumstance may arise when one of the two cores 200a or 200b is non-functional while both cores and their respective cache hierarchies are fabricated on a single integrated circuit chip. In such a circumstance, the castout mechanism and technique of the present invention enable the operational core to advantageously utilized the otherwise unused cache hierarchy units as an optional victim cache.

Figure 8A:
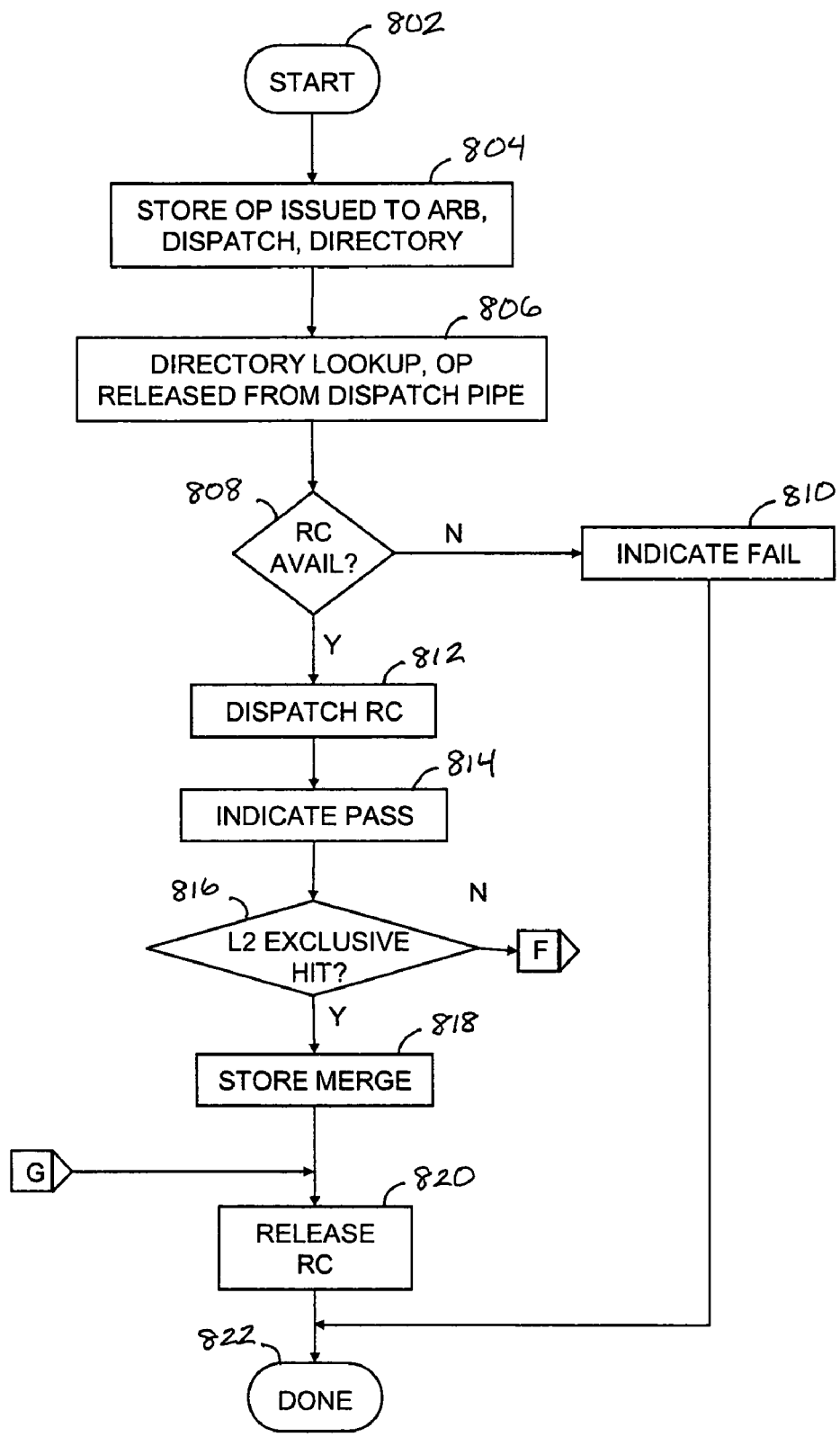
FIG. 8A is a high-level flow diagram illustrating conventional processing of a store operation.

The invention is applicable to castout operations results from load or store operations and FIG. 8A provides a high-level flow diagram illustrating conventional processing of a store operation by an exemplary L2 cache such as L2 cache 230 to which the castout processing of the present invention may be applied. The process commences as shown at steps 802 and 804 with a store operation from core 200 sent to arbiter 305, dispatch pipe 306, and directory 308. In accordance with conventional store operation processing, arbiter 305, dispatch 306, and directory 308 process the received store in parallel as illustrated at step 806. Specifically, the store request traverses dispatch pipe 306 and is release following the directory lookup in directory 308.

Following release of the store from dispatch pipe 306, continued processing of the command depends on availability of one of RC machines 312 for processing the command. As shown at steps 808, 810, and 822, the processing of the store operation terminates if no RC machine 312 is available. Otherwise, an available RC machine 312 is dispatched to handle the store operation as depicted at steps 808 and 812. A pass indicator signals a successfully dispatched RC (step 814) so that the store is not re-issued. If the requested cache line is in array 302 and is verified by the coherence state read from directory 308 as valid and exclusive to the cache, the data is store merged in array 302 as shown at steps 816 and 818. Processing of the cache hit concludes with the dispatched RC machine 312 being de-allocated or released as shown at steps 820 and 822.

Figure 8B:
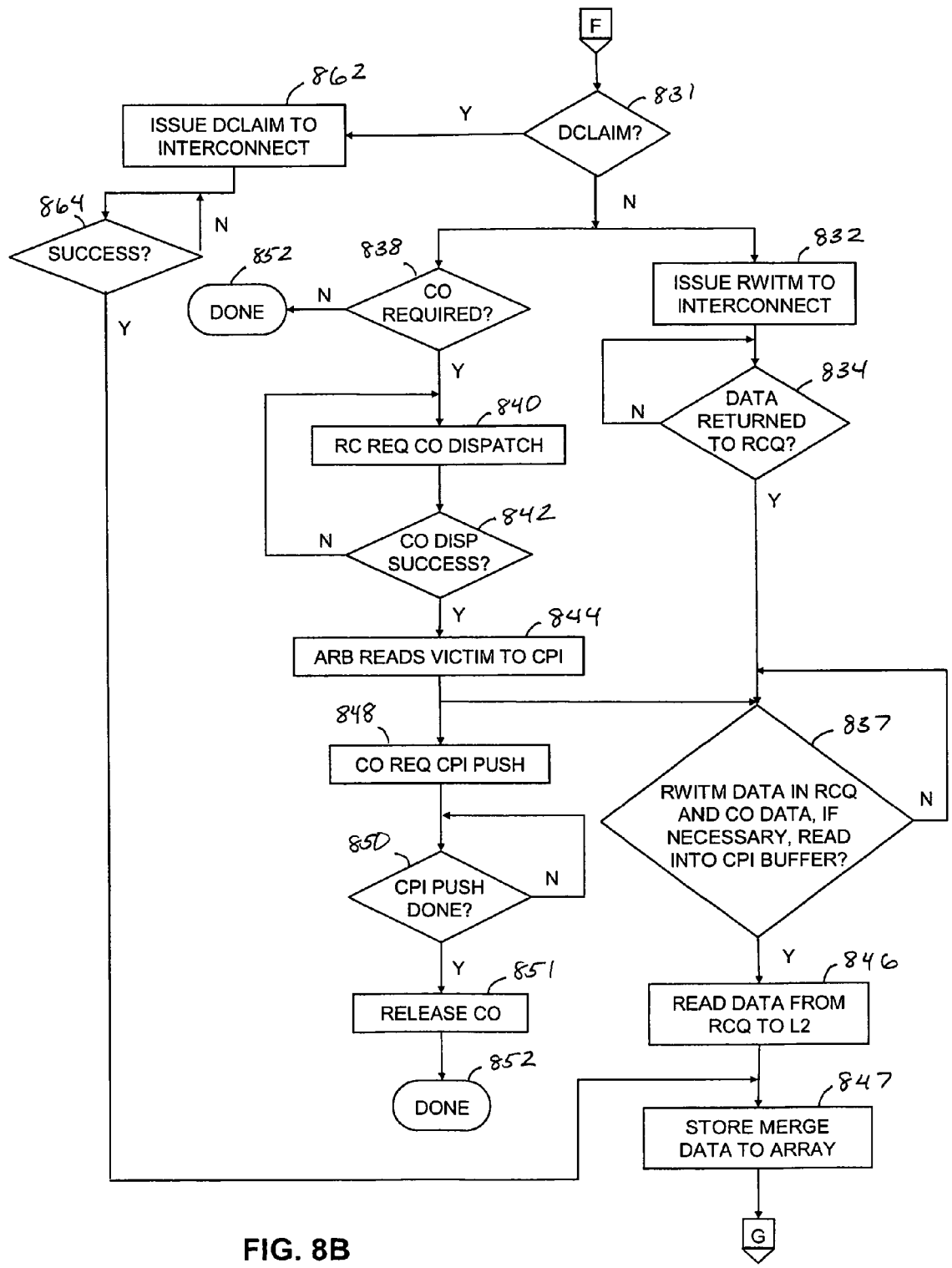
FIG. 8B is a high-level flow diagram depicting conventional handling of a cache miss on a store operation.

FIG. 8B depicts steps performed within L2 cache 230 in response to a miss at step 816. If the miss was due to shared data, a DCLAIM is issued and continues until is succeeds as shown at steps 862 and 864. After a successful DCLAIM, the data is store merged into the array as depicted at step 847. Finally, RC machine 312a is released as shown at step 820 and the read process terminates at step 822.

In the case of a true miss, and as depicted at step 832, the assigned RC machine 312 issues a read with intent to modify (RWITM) request on interconnect 114 and awaits return of the requested data into an RC queue 320 that buffers incoming cache lines to be placed in array 302. As shown at step 838, if a castout from the target congruence class in array 302 is not required, the castout process ends as shown at step 852. If a castout is required in accordance with congruence class occupancy or otherwise, RC machine 312 issues a castout request via M1 to arbiter 305 and dispatch pipe 306, which dispatches one of CO machines 310 to handle the castout, as illustrated at steps 838 and 840. The relative instruction processing responsibilities usually dictate that there are a greater number of RC machines 312 than CO machines 310. RC machine 312 therefore repeats the castout request until a CO machine 310 is available and successfully dispatched (steps 840 and 842).

Following successful dispatch of the CO machine (step 842), arbiter 305 reads the victim cache line out of array 302 to a CPI (castout push intervention) queue 318 (step 444) in preparation for the victim line to be placed in a lower level cache or system memory. Responsive to both the victim line being read out to CPI queue 318 at step 844 (if a castout was necessary) and the data being returned to the RCQ at step 834, the data read from the RC queue 320 to the L2 (step 846) and the store data is merged into the appropriate line in array 302, as shown at step 847.

Returning to castout processing, the CO machine 310 issues a request to fabric controller 316 for the victim line to be pushed from CPI queue 318 to the lower level memory via interconnect 114 (step 848). The victim line push is processed and completed followed by the CO machine being released as shown at steps 850, 851 and 852.

The present invention provides an improved castout/ castin method by which caches, such as L2 caches 230a and 230b which are otherwise private to their respective cores, can perform parallel victim caching in response to a cache miss necessitating a castout. In addition to providing a fast and high-capacity victim cache among same-level cache memories (i.e. L2-to-L2) without having to process a shared bus request, the invention facilitates maximum utilization of memory resources in a multiprocessor system in which each core has its direct (i.e. non snooped) access to a respective hierarchy.

Figure 9:
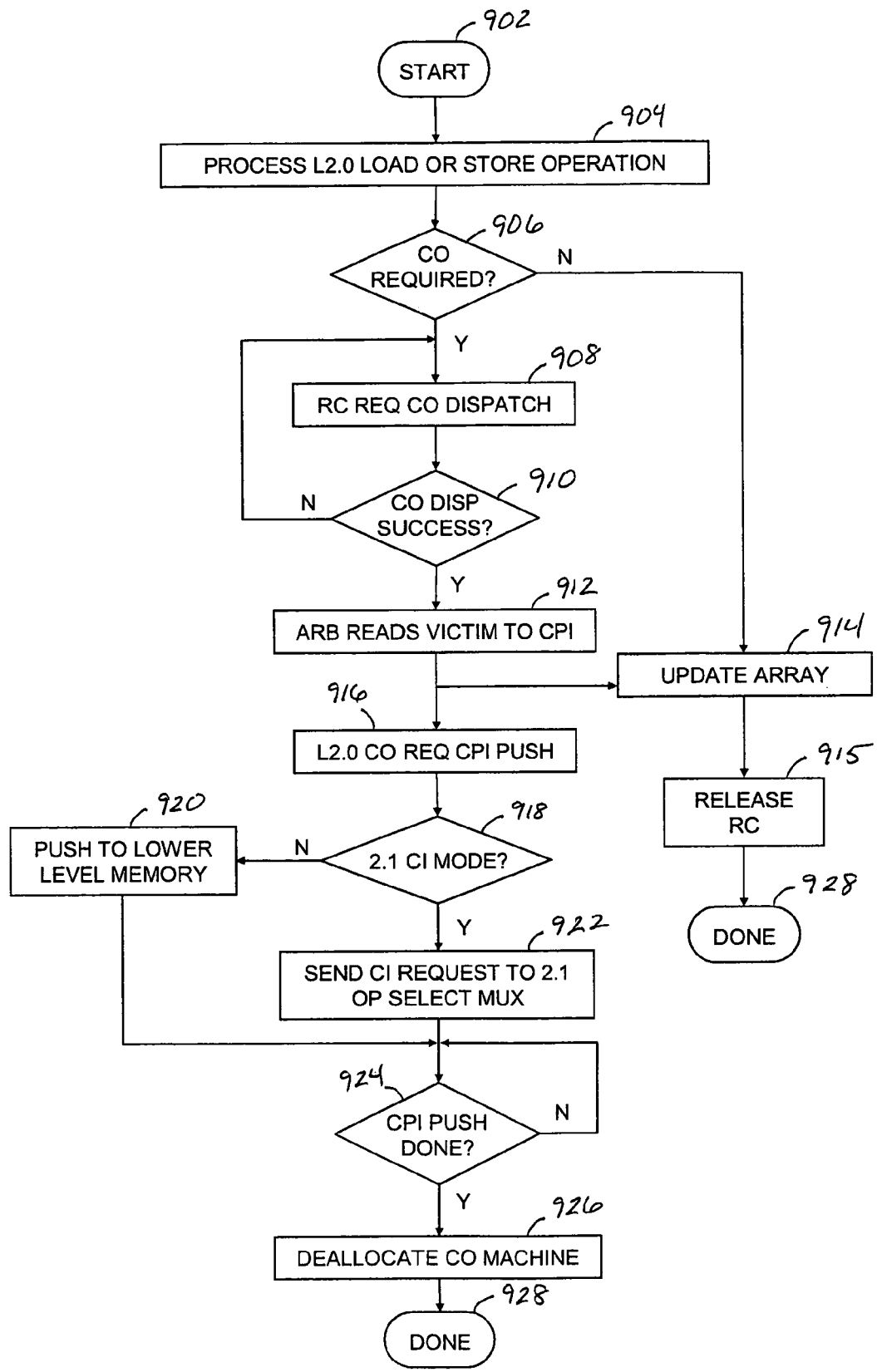
FIG. 9 is a high-level flow diagram illustrating an cache castout in accordance with the present invention.

Referring to FIG. 9 in conjunction with FIG. 5B there is depicted a high-level flow diagram illustrating a cache castout operation in accordance with the present invention. The process begins as illustrated at steps 902 and 904 with issuance and partial processing of a load operation, such as those described with reference to FIGS. 4A, 4B, 6A, and 6B, and 7, or a store operation, such as that described with reference to FIGS. 8A and 8B issued from core 200a to L2.0 cache 230a. The load or store is processed up to the point at which a castout determination is made with respect to cache array 302a. If a castout is not required for the current load or store operation, the data is transferred from RC queue 320a into array 302a and a merging of store data, if required, is accomplished as shown at steps 906 and 914. The process then continues to step 915 which depicts RC queue 320a being released and the data process concluding (step 928). If a castout is required, the allocated RC machine 312a issues a castout request via M1 to arbiter 305a and dispatch pipe 306a, which dispatches one of CO machines 310a to handle the castout, as illustrated at steps 906 and 908. RC machine 312a repeats the castout request until a CO machine 310a is available and successfully dispatched (steps 908 and 910).

Following successful dispatch of the CO machine (step 910), L2.0 arbiter 305a reads the victim cache line out of array 302a to CPI queue 318 (step 912) in preparation for the victim line to be selectively placed in a lower level cache or system memory as in conventional castout operations or in the L2.1 cache 230b in accordance with the invention. Responsive to the victim line being read out to CPI queue 318a, the read or write data buffered in the RC queue 320a is placed in the appropriate line in array 302a at step 914 which has been described, and the L2.0 CO machine 310a issues a request to fabric controller 316 for the victim line to be pushed from CPI queue 318a (step 916).

In accordance with the invention, the push request from L2.0 CO machine 310a depends on whether L2.0 caches 230a and L2.1 cache 230b are presently operating in the parallel victim cache mode of the present invention. For example, the parallel victim cache mode may be prompted by one of the cores (the 200b core is the presently described embodiment) being faulty or otherwise rendered non-functional. In such a case, the memory hierarchy directly associated with the non-functioning core (the L2.1 cache 230b in presently described embodiment) is available as a victim cache to accept castouts from the same-level cache unit (the L2.0 cache 230a in the present embodiment). In a preferred embodiment, fabric controller 316 may read a flag in a configuration register 332 that indicates whether or the cache units 230a and 230b are operating in parallel victim cache mode.

If, for example and as depicted at steps 918 and 920, parallel victim cache mode is not enabled in terms of L2.1 cache 230b operating in castin mode as indicated by configuration register 332, the castout is performed in the conventional manner in which the victim data is pushed to lower level memory via interconnect 114 and the castout concludes with the L2.0 castout machine 310a de-allocated (steps 920, 924, 926, and 928). If the configuration register 332 indicates that L2.1 cache 230b is operating in victim castin mode, fabric controller 316 sends a castin request to the L2.1 op select MUX M1. L2.1 cache 230b then processes the castin request as now depicted and described in FIG. 10.

Figure 10A:
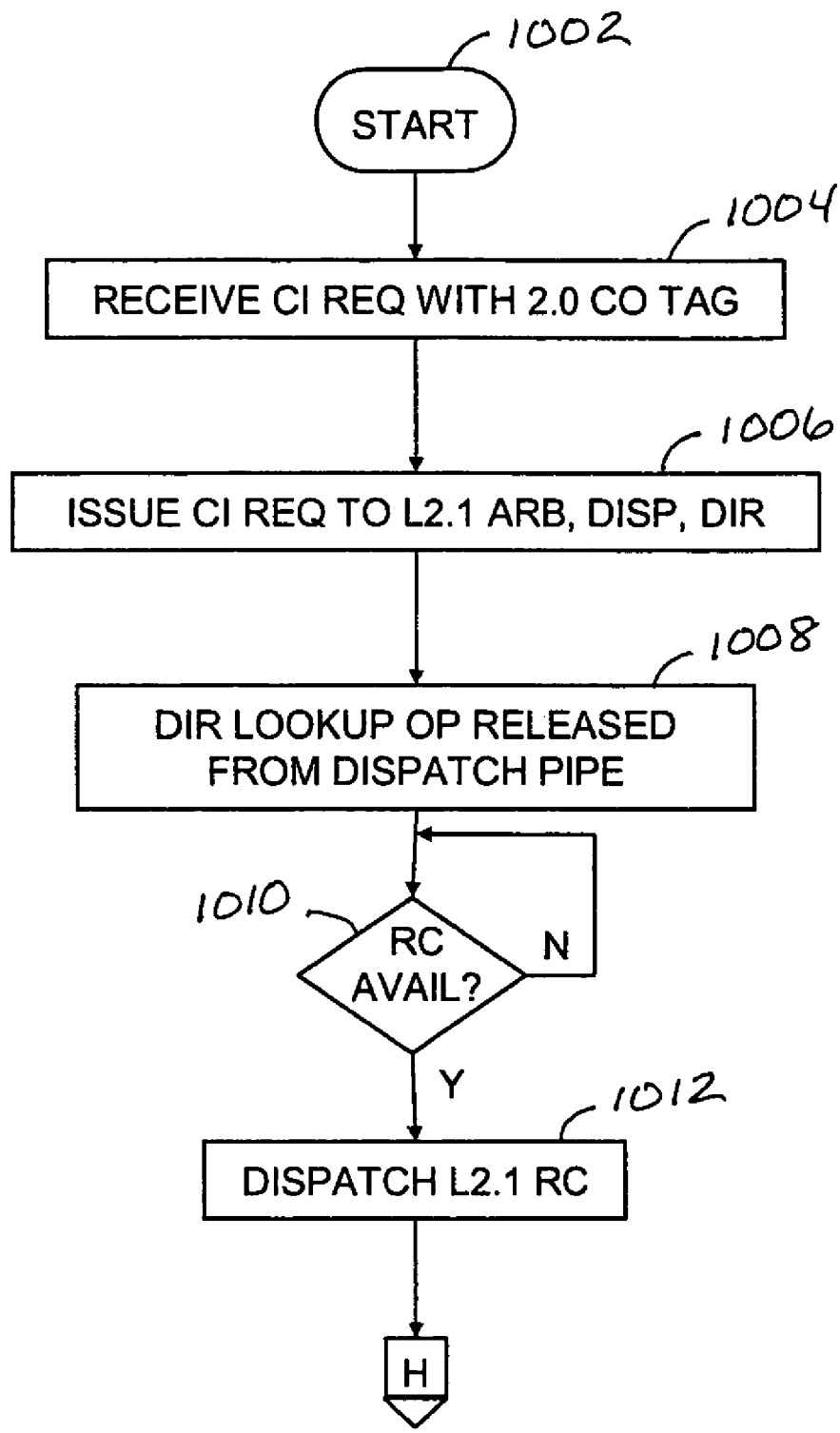
FIGS. 10A and 10B illustrate a high-level flow diagram depicting a cast in corresponding to the castout of FIG. 9 in accordance with the present invention.
Figure 10B:
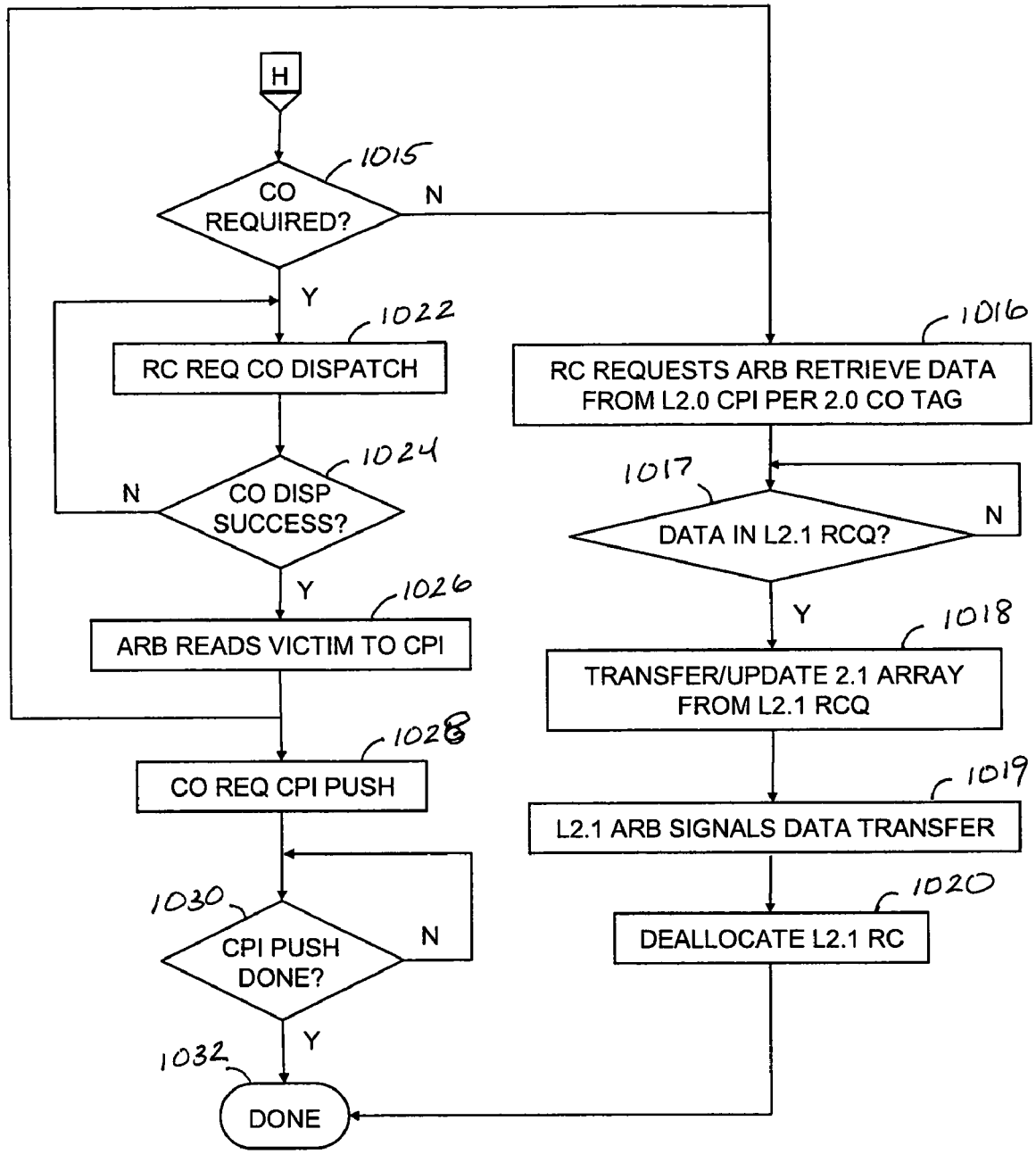

With reference to FIGS. 10A and 10B, there is illustrated a high-level flow diagram depicting a castin corresponding to the castout of FIG. 9 in accordance with the present invention. The process begins as shown at steps 1002 and 1004 with L2.1 op select MUX M1 receiving the castin request from fabric controller 316. MUX M1 issues the castin request to L2.1 arbiter 305b, dispatch pipe 306b, and directory 308b as depicted at step 1006. L2.1 arbiter 305b, dispatch pipe 306b, and directory 308b process the received castin request in parallel as illustrated at step 1008. Specifically, the castin request traverses dispatch pipe 306b and is released following the directory lookup in directory 308b.

Following release of the castin request from dispatch pipe 306b, continued processing of the command depends on availability of one of the L2.1 RC machines 312b for processing the command. As shown at step 1010, the process continues until an RC machine 312b is available.

Once an available RC machine 312b is dispatched to handle the request (step 1012), the RC machine 312b determines at step 1015 if a CO machine 310b is required to evict the cache block in victim cache 230b chosen to accept the castin. If no such CO machine is necessary, RC machine 312b sends a request to arbiter 305b to retrieve the L2.0 castout data from the L2.0 CPI queue 318a in accordance with the L2.0 CO tag received in the original castin request from fabric controller 316 (step 1014) and arbiter 305b signals CPI queue 318a with the tag to effectuate the transfer (step 1016).

Once the L2.0 castout data is available in the L2.1 RCQ (step 1017), L2 cache array 302b is updated as depicted at step 1018. The castin data process then continues with L2.1 arb 305b signaling the CO data transfer is complete (step 1019), deallocating L2.1 RC 312b (step 1020), and concluding as depicted at step 1032.

Returning to step 1015, if however, it is determined that a CO machine 310b is required to evict the cache block in victim cache 230b chosen to accept the castin, the process continues to step 1022 which depicts RC 312b issuing a CO request though mux M1 to dispatch a castout machine. Once CO machine 310b is dispatched (step 1024), arbiter 305b reads the selected cache line out of cache array 302b in CPI buffer 318b (step 1026). Once the cache line being castout of victim cache 320b has been read into CPI buffer 318b, the process continues at step 1016 to complete the castin data transfer as described above.

In addition, the process continues to steps 1028 and 1030 which depict the eviction of the selected line from L2.1 victim cache 230b to system memory via interconnect 114 and the process concludes as shown at step 1032.

It should be noted that the aforementioned direct intervention embodiments depicted and described with reference to FIGS. 2, 3, 4A, 4B, 5A, 6A, 6B, and 7 may be advantageous utilized in conjunction with the victim caching mechanisms and procedures depicted and described with reference to FIGS. 2, 3, 5B, 8A, 8B, 9, 10A and 10B to provide a fully functional L2 victim cache. Namely, L2 cache 230a preferably implements direct intervention as described above to retrieve data (including possibly modified data) from victim cache 230b.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. In a multi-processor system having multiple memory hierarchies each having an associated processor, a system for implementing victim caching among the memory hierarchies, said system comprising:
- a first cache memory hierarchy having multiple cache memory levels for supporting a first processor, wherein said first cache memory hierarchy includes a first semi-private cache unit that is directly accessible by said first processor without accessing a shared memory interconnect that provides a snooped memory access interface between said first cache memory hierarchy and a second cache memory hierarchy;
- said second cache memory hierarchy distinct from said first cache memory hierarchy and supporting a second processor distinct from said first processor, wherein said second cache memory hierarchy includes a second semi-private cache unit that is directly accessible by said second processor without accessing said shared memory interconnect;
- castout machine and fabric controller logic that, responsive to requiring a castout from said first semi-private cache unit, sends a cast in request from said first semi-private cache unit to said second semi-private cache unit, wherein said cast in request includes a cast out tag identifier of the first memory hierarchy;
- arbiter and read claim machine logic that, responsive to the cast in request, retrieves cast out data from the first semi-private cache unit to the second semi-private cache unit utilizing the cast out tag identifier;
- wherein said first semi-private cache unit includes:
  - a cache array and directory that store and index data, said cache array and directory including an arbiter logic module that, responsive to receiving a load request from said first processor, speculatively reads said cache array in parallel with a cache line directory lookup within said directory;
  - direct intervention logic that, responsive to receiving the load request from said first processor, speculatively issues a direct intervention request containing a cache line address of the load request to said second semi-private cache unit, said direct intervention request issued in parallel with said speculative read of said cache array and including the address of a cache line requested in the load request;
  - direct intervention logic that prior to issuing the load request as a snooped request on said shared memory interconnect responsive to a cache miss within said first semi-private cache unit, determines whether a negative acknowledgement has been received from said second semi-private cache unit, said negative acknowledgement indicating denial or failure of said direct intervention request;
  - direct intervention logic for issuing the load request as a snooped request on said shared memory interconnect only in response to determining that the negative acknowledgement has been received; and
  - direct intervention logic that responsive to a cache miss within said first semi-private cache unit, and in further response to a positive acknowledgement from said second semi-private cache unit indicating a cache hit responsive to said direct intervention request and containing a snoop machine identification of an available snoop machine within said second semi-private cache unit, sends a push request to said second semi-private cache unit to push the requested load data specified by the direct intervention request to said first semi-private cache unit, wherein said push request contains said snoop machine identification.

* * * * *